April 2, 1957 O. D. SMITH 2,787,092
CUTTING-OFF MACHINE
Filed March 30, 1954 6 Sheets-Sheet 1

INVENTOR
OLIVER DOUGLAS SMITH
by Walter S. Pleston
ATTORNEY

April 2, 1957 O. D. SMITH 2,787,092
CUTTING-OFF MACHINE
Filed March 30, 1954 6 Sheets-Sheet 3

INVENTOR
OLIVER DOUGLAS SMITH
by Walter S. Pleston
ATTORNEY

April 2, 1957     O. D. SMITH     2,787,092
CUTTING-OFF MACHINE
Filed March 30, 1954             6 Sheets-Sheet 5
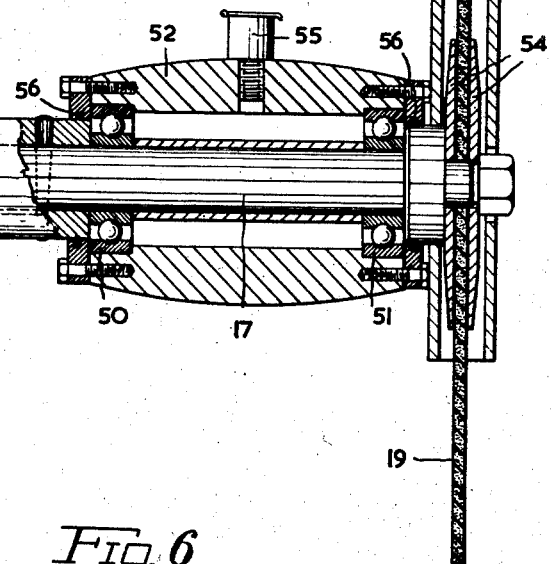
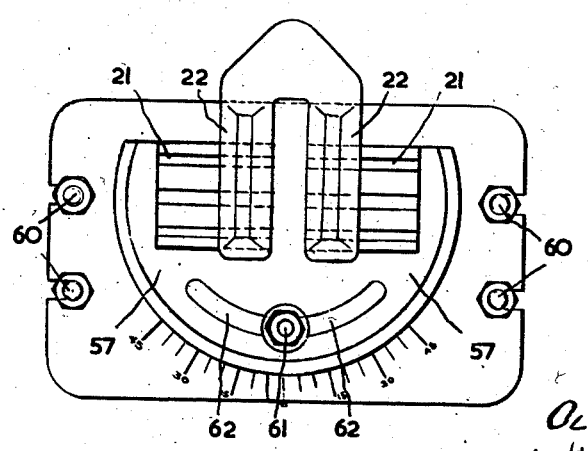
INVENTOR
OLIVER DOUGLAS SMITH
by Walter S. Olexton
ATTORNEY

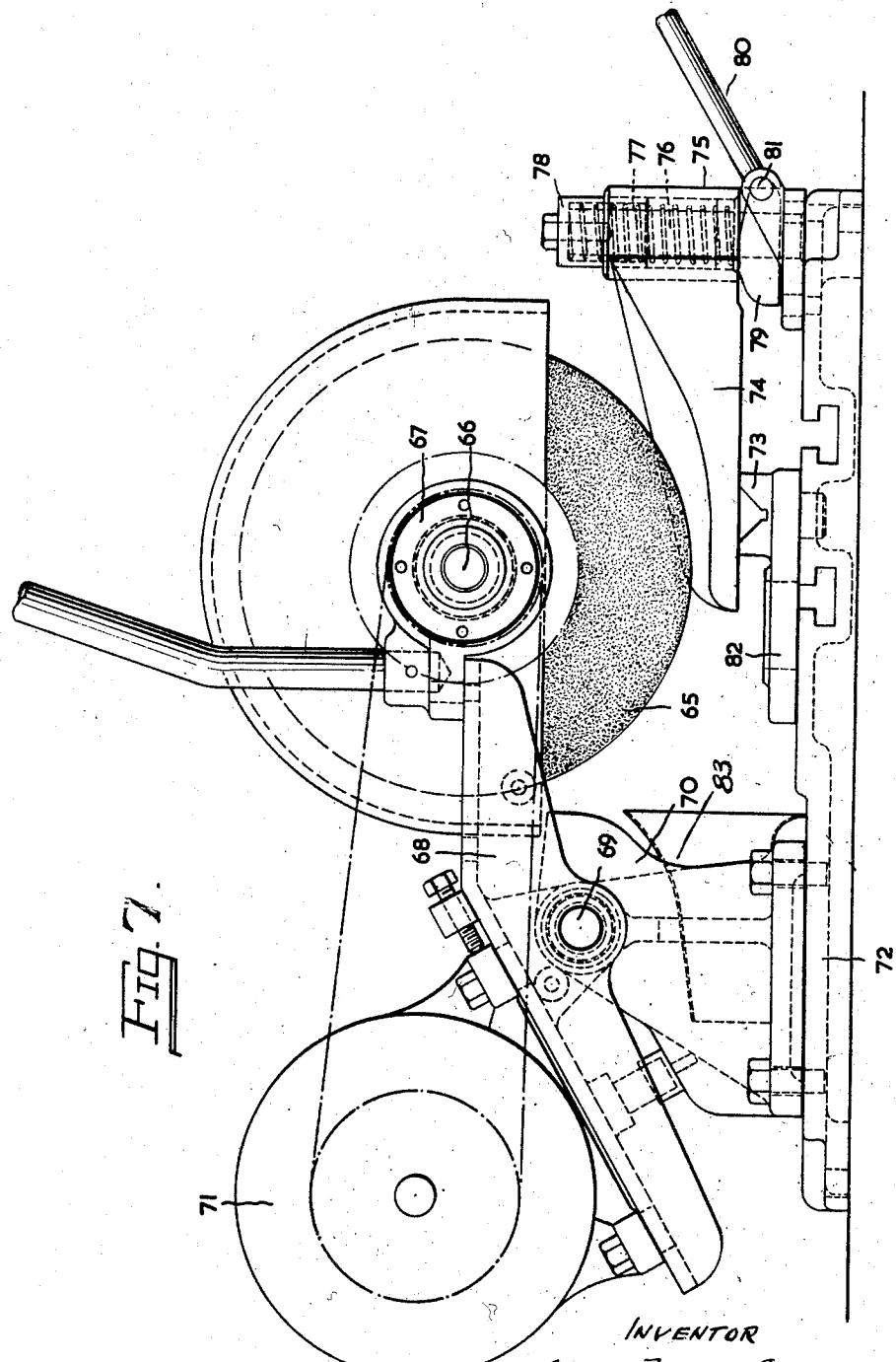

United States Patent Office 2,787,092
Patented Apr. 2, 1957

2,787,092

CUTTING-OFF MACHINE

Oliver Douglas Smith, Lapworth, England, assignor to Smith Bros. & Webb Limited, Birmingham, England, a British company Application March 30, 1954, Serial No. 419,797

Claims priority, application Great Britain March 30, 1953

3 Claims. (Cl. 51—98)

This invention relates to a new or improved cutting-off machine for cutting rod, tube, rolled or extruded sections and the like and refers particularly to a machine of the type in which the cutting is effected by a narrow abrasive wheel or a circular saw.

One object of my invention is to provide an improved machine of that type which has a number of practical advantages.

According to my invention a cutting-off machine comprises a rotatable cutting disc, which may be an abrasive wheel or circular saw, and a motor for driving it mounted on a head or frame which is angularly movable about a horizontal axis to bring the disc into engagement with the work, in combination with work holding means comprising an anvil which is angularly adjustable about a vertical axis and a vertically movable forked clamp adapted to engage the work on each side of the wheel and hold it down against the anvil, the clamp being urged into the clamping position by a spring, and being released for the insertion and removal of the work by means of a pedal or hand lever so that the holding of the work does not require any effort on the part of the operator.

The motor which drives the wheel may also drive a pump for delivering suds or other coolant on to the work during the cutting operation.

The anvil on which the work is held is preferably angularly movable through an angle of about 45° to each side of a position parallel to the axis of the wheel so that the work can be cut at right angles or at any other desired angle to its length.

Two practical cutting-off machines in accordance with my invention are illustrated by way of example in the accompanying drawings in which:

Figure 5 is a fragmentary section of the wheel spindle.

Figure 6 is a plan of the anvil on which the work is held.

Figure 7 is a side elevation of a smaller bench-type machine.

Figure 1:
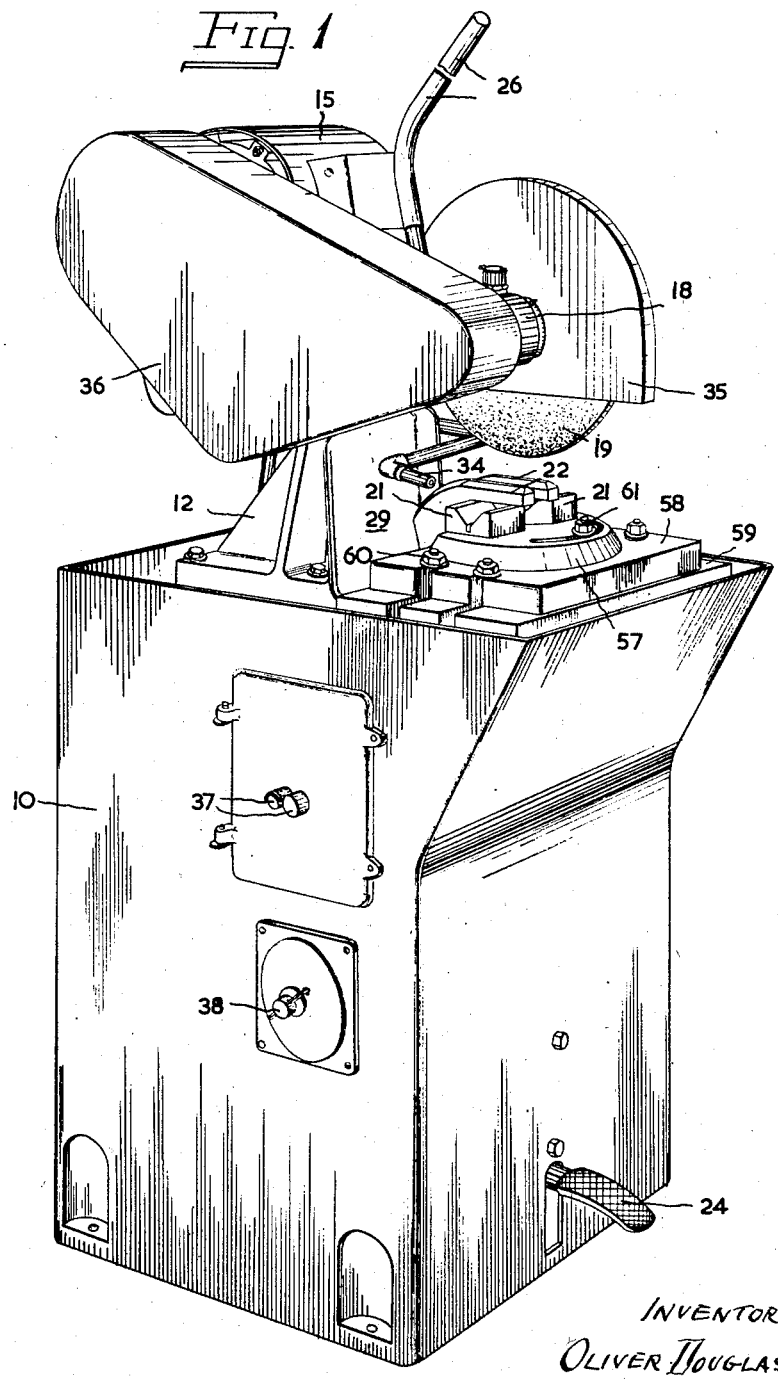
Figure 1 is a perspective view of a pedestal machine for heavy work.
Figure 2:
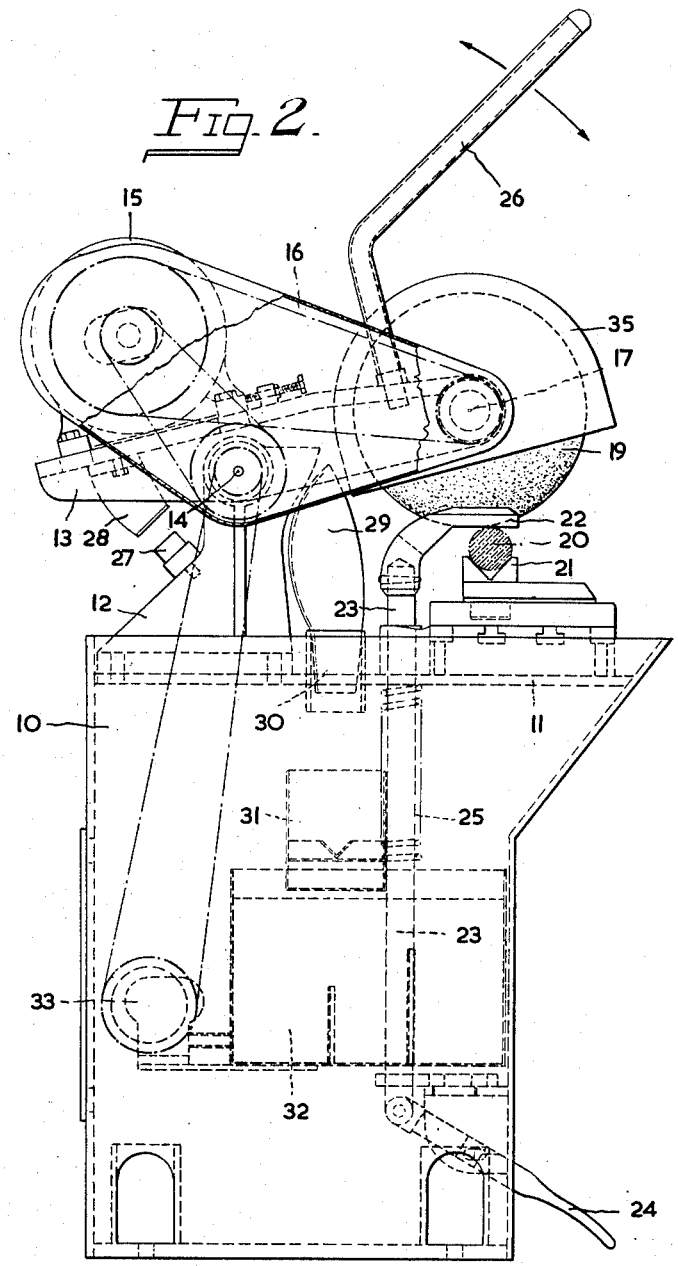
Figure 2 is a side elevation of the machine showing a piece of work to be cut in position.
Figure 3:
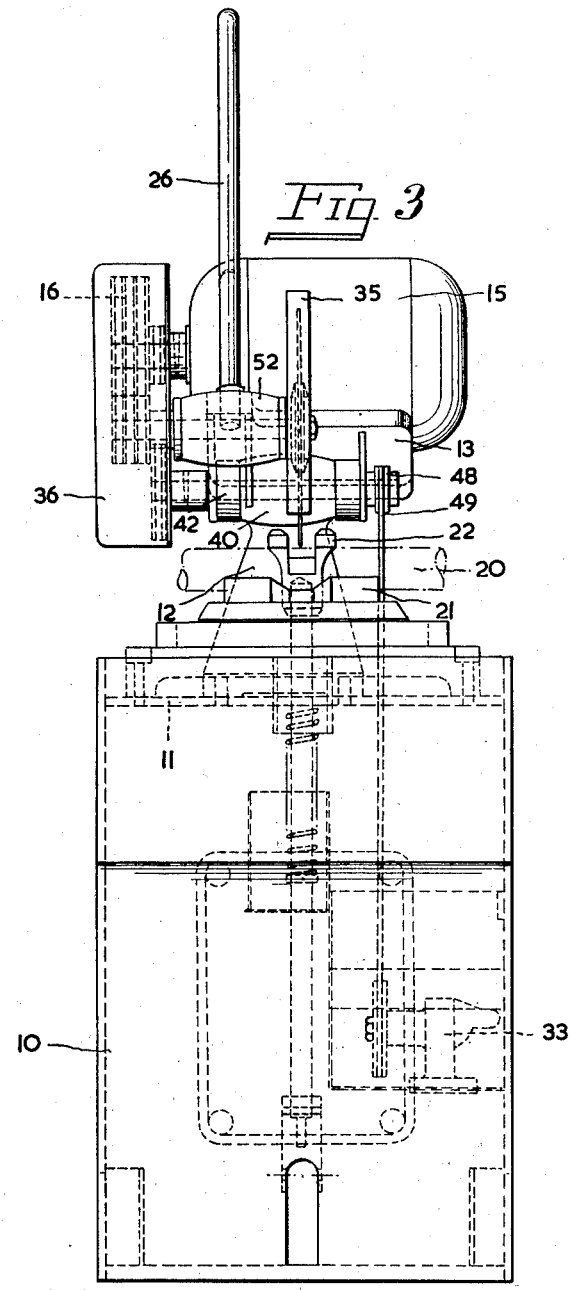
Figure 3 is a front elevation of the machine.

In the machine illustrated in Figures 1 to 6 the mechanism is mounted on a hollow pedestal or base 10 which is fabricated from steel sheet and houses a suds pump and tank.

A horizontal plate 11 is welded into the upper end of the base a short distance below the upper edge of the walls. A cast-iron pillar 12 is bolted to the rear part of the plate and a frame 13 is mounted to rock about a horizontal axis 14 in the upper end of the pillar. An electric motor 15 is adjustably mounted on the frame 13 behind the axis 14 and a pulley on the motor shaft is coupled by triple V belts 16 to a pulley on a spindle 17 rotatably mounted in a head 18 on the front end of the frame. An abrasive cutting wheel 19 is mounted on the spindle.

The work 20 is held in an anvil comprising two spaced V blocks 21 on which it is held by a forked clamp 22 on the upper end of a vertically movable rod 23 extending downwardly into the base. A pedal 24 pivoted in the base is coupled to the lower end of the rod so that by depressing the pedal which projects through an opening in the front of the base the rod and clamp are raised against the action of a compression spring 25 mounted on the rod and urging the rod downwardly. Thus the clamp is raised by the pedal for the insertion of the work into the anvil and on release of the pedal the clamp holds the work firmly in position and the operator is relieved of effort.

A forwardly projecting lever handle 26 is fixed in the frame 13 near its front end to rock the frame forwardly about its axis to bring the wheel down on to the work. On release of the handle the frame is returned by the weight of the motor behind the rocking axis, the rest position of the frame being determined by a resilient stop or buffer 27 on the pillar which is engaged by a lug 28 on the frame.

The cutting of the work produces a large quantity of sparks or particles of metal at high temperatures and to trap them a forwardly facing funnel 29 is arranged immediately behind the anvil. This funnel may lead through an opening in the pillar 12 into a duct which may be adapted to be connected to a dust-collecting system. In the arrangement shown in Figures 1 and 2 the funnel leads the sparks downwardly through a nozzle 30 from which they are directed into a water tank 31 in the base in which they are trapped.

The machine may be used for cutting dry but in the machine illustrated provision is made for the supply of suds or other coolant to the wheel. For this purpose a large tank 32 for coolant is mounted in the base below the tank 31. The coolant is withdrawn from the tank by a suds pump 33 which is driven by a belt from the motor as described below and the pump delivers the coolant to a nozzle 34 adjacent to the anvil, said nozzle 34 being arranged to direct the coolant between the fingers 22 as will be evident from the drawing.

The wheel is guarded by a deep guard 35 which extends well below the axis of the wheel, and a removable guard 36 encloses the driving belts 16.

The motor is controlled by start and stop push-buttons 37 and an on-off switch 38 mounted on the side of the base.

Figure 4:
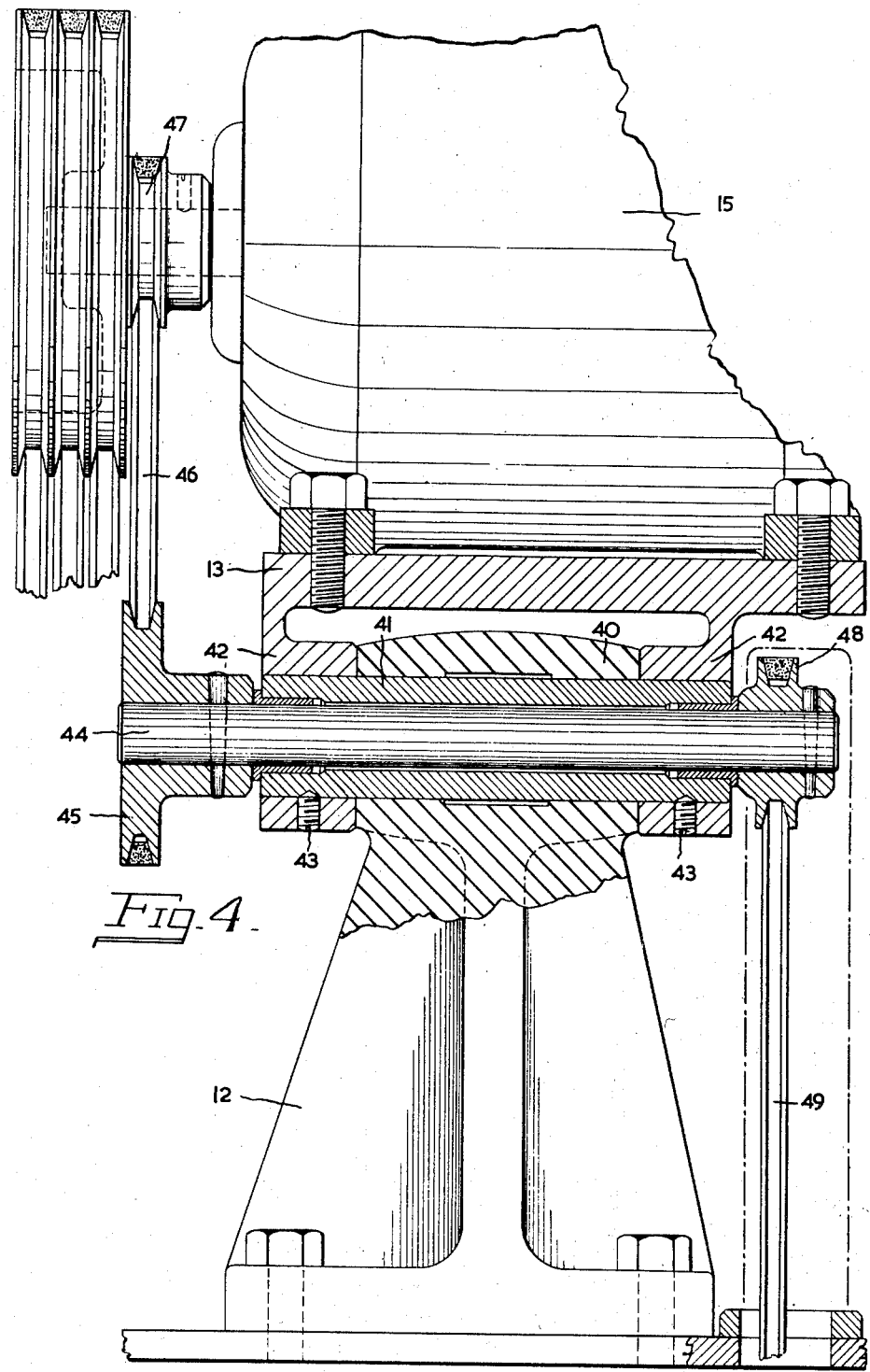
Figure 4 is a fragmentary section of the mounting for the rocking frame.

Details of various parts of the machine are shown in Figures 4 to 6.

Figure 4 shows a long horizontal boss 40 on the upper end of the pillar 12 in which is angularly movable a sleeve 41. The frame 13 has a pair of downwardly depending lugs 42 between which the boss 40 fits, and the ends of the sleeve 41 are fixed in the lugs 42 by set-screws 43. A spindle 44 extends axially through the sleeve and is rotatably mounted in bushes in the ends of the sleeve. One end of the spindle carries a pulley 45 which is coupled by a belt 46 to a small pulley 47 on the motor shaft. Another pulley 48 on the other end of the spindle is coupled by a belt 49 to a pulley on the suds pump.

Figure 5 shows the mounting of the wheel spindle 17. The spindle is mounted in spaced ball bearings 50, 51 in a long hollow boss 52 mounted on the front end of the frame 13. The multiple pulley 53 through which the spindle is driven is fixed on one end of the spindle and the wheel 19 is mounted on the other end of the spindle between clamping discs 54.

A lubricator 55 is mounted on the boss 52 for supplying oil to the bearings and oil seals 56 are provided on the outer sides of the bearings.

Figure 6 is a plan of the anvil and clamp for holding the work. The anvil comprises spaced aligned V blocks 21 with a narrow gap between their inner ends which are chamfered off at an angle. The blocks are fixed to a part-circular table 57 which is angularly movable about a vertical axis on a plate 58 secured to a bed-plate 59 on the machine by bolts 60 engaging in T slots in the bed-plate, as shown in Figure 1, so that it can be readily changed. The table 57 is located angularly by a nut on a stud 61 projecting upwardly from the plate 58 through an arcuate slot 62 in the table of sufficient length to allow the table to be moved through an angle of 45° or more to each side of its normal position so that the work can be cut at right angles or at any other desired angle to its length. The edge of the table or the surface of the plate 58 adjacent to the edge of the table may be graduated in degrees as shown in Figure 6.

The work is held down on the anvil by the clamp 22 which comprises a pair of parallel substantially horizontal fingers spaced apart at a distance slightly greater than the thickness of the cutting wheel. The fingers are integral with a head which is fixed on the upper end of the vertically movable spring-loaded rod 23. As the fingers engage the work on each side of and close to the wheel vibration of the work is prevented.

A sheet metal guard may be mounted on the front of the base 10 of the machine but if so the guard is made readily detachable to allow work of substantial length to be inserted from the front.

In the bench-type machine shown in Figure 7 the cutting wheel or saw 65 is carried by a spindle 66 rotatably mounted in a housing 67 fixed to the front end of a frame 68 which is mounted to rock about a horizontal axis 69 in the upper end of a pillar 70. The spindle 66 is driven by a belt from an electric motor 71 mounted on the rear part of the frame behind the rocking axis. The pillar 70 is bolted to a base plate 72 adapted to be mounted on a bench. The work is received in an anvil 73 in which it is held by parallel fingers 74 projecting rearwardly from a sleeve 75 slidably mounted on a vertical column 76 fixed in the front of the base-plate. The sleeve is urged downwardly by a compression spring 77 housed in the sleeve and in a flanged cap 78 fixed on the upper end of the column. To move the fingers upwardly for the insertion of work into the anvil the sleeve is raised against the action of the spring by a cam 79 actuated by a lever 80 pivoted at 81.

The anvil is mounted on a table 82 which is angularly movable on the base.

A wide-mouthed funnel 83 is mounted directly behind the anvil to collect sparks. The funnel extends through an opening in the pillar 70 and its rear end is adapted to be connected to a dust-collecting duct.

In each of the machines illustrated the cutting disc is an abrasive wheel but the wheel may be replaced by a metal-cutting circular saw.

Further, if the machine is to be used for cutting material into short uniform lengths two or more abrasive wheels or saws may be mounted on the same spindle at the required axial spacing.

I claim:
1. A cutting-off machine comprising a base, a pillar on the base, a frame angularly movable about a horizontal axis on the pillar, a spindle for carrying a cutting disc mounted in bearings on the frame on one side of said axis, an electric motor mounted on the frame on the other side of said axis and drivably coupled to said spindle, a work-receiving anvil movable about a vertical axis on said base below the cutting disc, vertically movable clamping means for holding work down on said anvil, said clamping means comprising a pair of parallel fingers integral with a head fixed on the upper end of a rod guided for vertical movement in said base, a compression spring urging said rod in a downward direction, and a pedal pivotally mounted in said base, said pedal being coupled to said rod for raising said rod and fingers vertically against the action of said spring, for the introduction of work onto said anvil.

2. A cutting-off machine comprising a base, a pillar on the base, a frame angularly movable about a horizontal axis on the pillar, a spindle for carrying a cutting disc mounted on bearings on the frame on one side of said axis, an electric motor mounted on the frame on the other side of said axis and drivably coupled to said spindle, a work-receiving anvil movable about a vertical axis on said base below the cutting disc, vertically movable clamping means for holding work down on said anvil, said clamping means comprising a pair of parallel fingers integral with a sleeve slidably mounted on a vertical guide on said base, a spring urging said sleeve in a downward direction, and a lever-operated cam for raising said sleeve and fingers vertically against the action of said spring, for the insertion of work onto said anvil.

3. A cutting-off machine comprising a base, a pillar on the base, a frame angularly movable about a horizontal axis on the pillar, a spindle for carrying a cutting disc mounted in bearings on the frame on one side of said axis, an electric motor mounted on the frame on the other side of said axis and drivably coupled to said spindle, a work-receiving anvil movable about a vertical axis on said base below the cutting disc, vertically movable clamping means for holding work down on said anvil, said clamping means comprising a pair of parallel fingers integral with carrying means guided for vertical movement, a spring urging said fingers and carrying means in a downward direction, and means operable to raise said fingers and carrying means vertically against the action of said spring for the introduction of work on to said anvil.

References Cited in the file of this patent

UNITED STATES PATENTS

| Number | Name | Date |
|---|---|---|
| Re. 20,466 | Lewis et al. | Aug. 10, 1937 |
| 1,992,147 | Gordon | Feb. 19, 1935 |
| 2,201,408 | Robinson | May 21, 1940 |
| 2,201,658 | Whitney | May 21, 1940 |
| 2,343,556 | Jacobsen | Mar. 7, 1944 |
| 2,361,961 | Pruitt | Nov. 7, 1944 |
| 2,401,659 | Pealer | June 4, 1946 |
| 2,464,117 | Coates | Mar. 8, 1949 |
| 2,465,399 | Robinson | Mar. 29, 1949 |